(12) United States Patent
Ino (10) Patent No.: US 7,847,722 B2
(45) Date of Patent: Dec. 7, 2010

(54) SECONDARY SURVEILLANCE RADAR AND METHOD OF ANALYZING REPLIES FOR SECONDARY SURVEILLANCE RADAR

(75) Inventor: Masami Ino, Tama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 986 days.

(21) Appl. No.: 11/627,552

(22) Filed: Jan. 26, 2007

(65) Prior Publication Data

US 2010/0253566 A1 Oct. 7, 2010

(51) Int. Cl.
*G01S 13/74* (2006.01)
*G01S 13/00* (2006.01)

(52) U.S. Cl. .............. 342/32; 342/29; 342/30; 342/36; 342/37; 342/42; 342/43; 342/44; 342/175; 342/195; 701/1; 701/3; 701/120

(58) Field of Classification Search ............. 342/27–40, 342/42–51, 175, 195, 450–465; 701/1, 3–18, 701/120–122, 300, 301; 340/945, 961, 963, 340/971
See application file for complete search history.

(56) References Cited

U.S. PATENT DOCUMENTS

| | | | | |
|---|---|---|---|---|
| 3,801,980 A * | 4/1974 | Danton et al. | ................. | 342/45 |
| 4,454,510 A * | 6/1984 | Crow | ......................... | 342/32 |
| 5,089,822 A * | 2/1992 | Abaunza et al. | ............... | 342/30 |
| 6,195,609 B1 * | 2/2001 | Pilley et al. | ................. | 701/120 |
| 6,337,652 B1 * | 1/2002 | Shiomi et al. | .................. | 342/37 |
| 6,380,869 B1 * | 4/2002 | Simon et al. | ................ | 340/945 |
| 6,483,453 B2 * | 11/2002 | Oey et al. | ...................... | 342/29 |
| 6,573,858 B1 | 6/2003 | Fung et al. | | |
| 7,043,355 B2 * | 5/2006 | Lai | ............................. | 701/120 |
| 7,095,360 B2 * | 8/2006 | Kuji et al. | ...................... | 342/29 |
| 7,132,982 B2 * | 11/2006 | Smith et al. | ................. | 342/456 |
| 7,408,498 B2 * | 8/2008 | Kuji et al. | ..................... | 342/37 |
| 7,663,531 B2 * | 2/2010 | Kuji et al. | ..................... | 342/32 |
| 2002/0063653 A1 * | 5/2002 | Oey et al. | ...................... | 342/29 |
| 2004/0189521 A1 * | 9/2004 | Smith et al. | ................. | 342/456 |
| 2005/0083226 A1 * | 4/2005 | Kuji et al. | ..................... | 342/29 |
| 2006/0030994 A1 | 2/2006 | Lai | | |
| 2006/0181447 A1 * | 8/2006 | Kuji et al. | ..................... | 342/32 |

OTHER PUBLICATIONS

Michael C. Stevens, "Secondary Surveillance Radar", Arthech House, XP-002440839, 1988, p. 161, paragraph 7.6-p. 163.

(Continued)

*Primary Examiner*—Bernarr E Gregory
(74) *Attorney, Agent, or Firm*—Oblon, Spivak, McClelland, Maier & Neustadt, L.L.P.

(57) ABSTRACT

Provided is a secondary surveillance radar with an improved capability of eliminating an unnecessary Mode A/C target report, which includes a transmission unit transmitting interrogations, a reception unit receiving replies, from a transponder, corresponding respectively to the interrogations, and a signal processing unit generating a Mode S target report and a Mode A/C target report from the replies. The radar also includes a combiner generating a Mode S track and a Mode A/C track respectively from the Mode S and the Mode A/C reports, and then judging whether the Mode S report and the Mode A/C report are of the same target on the basis of the Mode S and the Mode A/C tracks. When the Mode S and the Mode A/C reports are of the same target, the combiner rejects the Mode A/C report.

2 Claims, 5 Drawing Sheets

OTHER PUBLICATIONS

"Eurocontrol Standard Document for Suveillance Data Exchange Part 4 Transmission of Monoradar Target Reports", Eurocontrol, XP-002440836, Nov. 1, 2000, pp. 1-55.

John L. Baker, et al., "Mode S System Design and Architecture", Proceedings of the IEEE, vol. 77, No. 11, XP-000101183, Nov. 1, 1989, pp. 1684-1694.

U.S. Appl. No. 12/180,713, filed Jul. 28, 2008, Ino.

Yoshio Hashida, et al., "Secondary Surveillance Radar for Air Traffic Control—SSR Mode S", Toshiba Review, vol. 59, No. 2, 2004, pp. 58-61.

\* cited by examiner

SECONDARY SURVEILLANCE RADAR AND METHOD OF ANALYZING REPLIES FOR SECONDARY SURVEILLANCE RADAR

BACKGROUND OF THE INVENTION

1. Field of the Invention

The present invention relates to a secondary surveillance radar and a method of analyzing replies for secondary surveillance radar, which receives replies corresponding respectively to interrogations transmitted to a transponder of an aircraft, and which analyzes contents of the replies.

2. Description of the Related Art

Radars for aircraft surveillance which are used for air traffic control are broadly divided into a primary surveillance radar (PSR) and a secondary surveillance radar (SSR).

The PSR is designed to acquire information on a position of an aircraft by sending out radio waves from the ground, and by receiving and processing reflection waves thereof.

On the other hand, the SSR is designed to obtain various kinds of information on an aircraft as follows. In the SSR, interrogations are transmitted from an interrogator placed on the ground equipment to a transponder installed in an aircraft. Then replies corresponding respectively to the interrogations are received.

The SSR has several modes depending on what kind of information is to be obtained. The modes are categorized into Mode A, Mode C and Mode S. Mode A is used for obtaining identification information on an aircraft, and Mode C is used for obtaining altitude information. Mode S has an individually selective calling function using an ID (a 24-bit address) given to each aircraft. By use of Mode S, route information and velocity information can be obtained in addition to information of the abovementioned kinds (identification information and altitude information) (for example, refer to "Secondary Surveillance Rader for Air Traffic Control—SSR Mode S" (Yoshio Hashida, Hisashi Ootomo and Yoshinori Kuji, Toshiba Review Vol. 59 No. 2 (2004), pp. 58-61)).

Note that, in the following description, "Mode A" and "Mode C" mentioned above will be collectively called as Mode A/C as appropriate.

The abovementioned Mode S and Mode A/C can be used, in the same SSR, in combination with each other. For this reason, even when a Mode S transponder has made an inappropriate reply for some reason, a position and the like of an aircraft can be identified by receiving a Mode A/C reply.

However, in the case of using Mode S and Mode A/C in combination with each other, an interrogator used therefor constantly receives both Mode S reply and Mode A/C reply. For this reason, such a problem as described below sometimes occurs.

That is, when a Mode S transponder is functioning properly, the interrogator can identify an aircraft only with a Mode S reply. However, even in this case, this interrogator receives not only a Mode S reply but also an unnecessary Mode A/C reply from the same aircraft. Then, according to these signals, target reports with respect to Mode S and Mode A/C are generated respectively.

As a method of avoiding a situation like this, a method can be cited in which a combiner is provided in an interrogator for eliminating unnecessary Mode A/C target reports.

However, in the abovementioned combiner, there are problems as described below.

In a general combiner, positional information, an altitude and a Mode A code contained in one target report are compared respectively with those contained in another target report comparable thereto. If these coincide with them under a given condition, the Mode S reply and the Mode A/C reply are judged as having been transmitted from the same aircraft.

However, in a case where a Mode A validity (Va) and a Mode C validity (Vc) in the Mode A/C target report are low (zero), this Mode A/C target report may possibly have been transmitted from another aircraft, and thus cannot be rejected (eliminated).

Additionally, an incorrect collision alert may possibly be issued on the basis of the Mode A/C target report that has not been rejected.

Moreover, a Mode A/C target report, which should not be rejected by right, may be rejected in the following case. In order to unfailingly reject unnecessary Mode A/C target reports, any Mode A/C target report having low validities (Va=0 and Vc=0) is rejected only because of existence of positional correlation with a corresponding Mode S target report. However, distance information contained in each Mode A/C target report indicates a slant range (a linear distance from an antenna to each aircraft). For this reason, the rejected report may be possibly a report regarding another aircraft. The report should not have been rejected.

SUMMARY OF THE INVENTION

The present invention has been made in consideration of the abovementioned problems in the conventional technology. An object of the present invention is to provide a secondary surveillance radar and a method of analyzing replies for secondary surveillance radar, which are improved in capability of eliminating an unnecessary Mode A/C target report.

One aspect of the present invention is a secondary surveillance radar which identifies an aircraft by transmitting interrogations to a transponder installed in an aircraft, by receiving replies corresponding respectively to the interrogations, and by then analyzing contents of the replies. The secondary surveillance radar includes: interrogation transmitting means which transmits a first Mode S only all call interrogation and a Mode A only all call interrogation at the time of a first sweep operation, which transmits a first Mode C interrogation at the time of a second sweep operation, which transmits a first Mode A interrogation at the time of a third sweep operation, which transmits a second Mode S only all call interrogation and a Mode C only all call interrogation at the time of a fourth sweep operation, which transmits a second Mode A interrogation at the time of a fifth sweep operation, and which transmits a second Mode C interrogation at the time of a sixth sweep operation; target report generating means, which receives replies corresponding respectively to the Mode S only all call interrogations, the Mode A only all call interrogation, the Mode A interrogations, the Mode C only all call interrogation, and the Mode C interrogations, and which generates a Mode S target report and a Mode A/C target report on the basis of these replies; track information generating means, which generates, on the basis of the Mode S target report, Mode S track information indicating a flight track of the aircraft, and which generates, on the basis of the Mode A/C target report, Mode A/C track information indicating a flight track of the aircraft; judgment means, which judges, on the basis of the Mode S track information and the Mode A/C track information, whether or not the Mode S target report and the Mode A/C target report are for the same target; and combiner means which eliminates the Mode A/C target report in a case where the Mode S target report and the Mode A/C target report are for the same target and outputs the Mode S target report only, and, in the other case, which outputs both the Mode S target report and the Mode A/C target report.

Another aspect of the present invention is a method of analyzing replies for secondary surveillance radar, in which interrogations are transmitted to a transponder installed in an aircraft, replies corresponding respectively to the interrogations are received, and contents of the replies are analyzed. The method includes the steps of: transmitting a first Mode S only all call interrogation and a Mode A only all call interrogation at the time of a first sweep operation, transmitting a first Mode C interrogation at the time of a second sweep operation, transmitting a first Mode A interrogation at the time of a third sweep operation, transmitting a second Mode S only all call interrogation and a Mode C only all call interrogation at the time of a fourth sweep operation, transmitting a second Mode A interrogation at the time of a fifth sweep operation, and transmitting a second Mode C interrogation at the time of a sixth sweep operation; receiving replies corresponding respectively to the Mode S only all call interrogations, the Mode A only all call interrogation, the Mode A interrogations, the Mode C only all call interrogation and the Mode C interrogations, and generating a Mode S target report and a Mode A/C target report on the basis of these replies; generating, on the basis of the Mode S target report, Mode S track information indicating a flight track of the aircraft, and generates, on the basis of the Mode A/C target report, Mode A/C track information indicating a flight track of the aircraft; judging, on the basis of the Mode S track information and the Mode A/C track information, whether or not the Mode S target report and the Mode A/C target report are for the same target; eliminating the Mode A/C target report in a case where the Mode S target report and the Mode A/C target report are for the same target; and outputting the Mode S target report only in the case where the Mode S target report and the Mode A/C target report are for the same target, and, in the other case, both the Mode S target report and the Mode A/C target report.

According to the present invention, it becomes possible to correctly make judgment on whether or not the Mode A/C target report can be rejected, and to provide the secondary surveillance radar and the method of analyzing replies for secondary surveillance radar, which are improved in capability of eliminating an unnecessary Mode A/C target report.

DETAILED DESCRIPTION OF PREFERRED EMBODIMENTS

An embodiment of the present invention will be described below on the basis of the drawings. Note that the following embodiment is provided merely for the purpose of explaining the present invention, and is not intended to limit the scope of the present invention. Accordingly, while any person skilled in the art can adopt various embodiments each including any one of, or all of elements of the embodiment, such embodiments are also included in the scope of the present invention. Additionally, in all of the drawings for explaining the following embodiment, the same reference numerals are given to the corresponding elements, and repetitive explanations thereon will be omitted.

Figure 1:
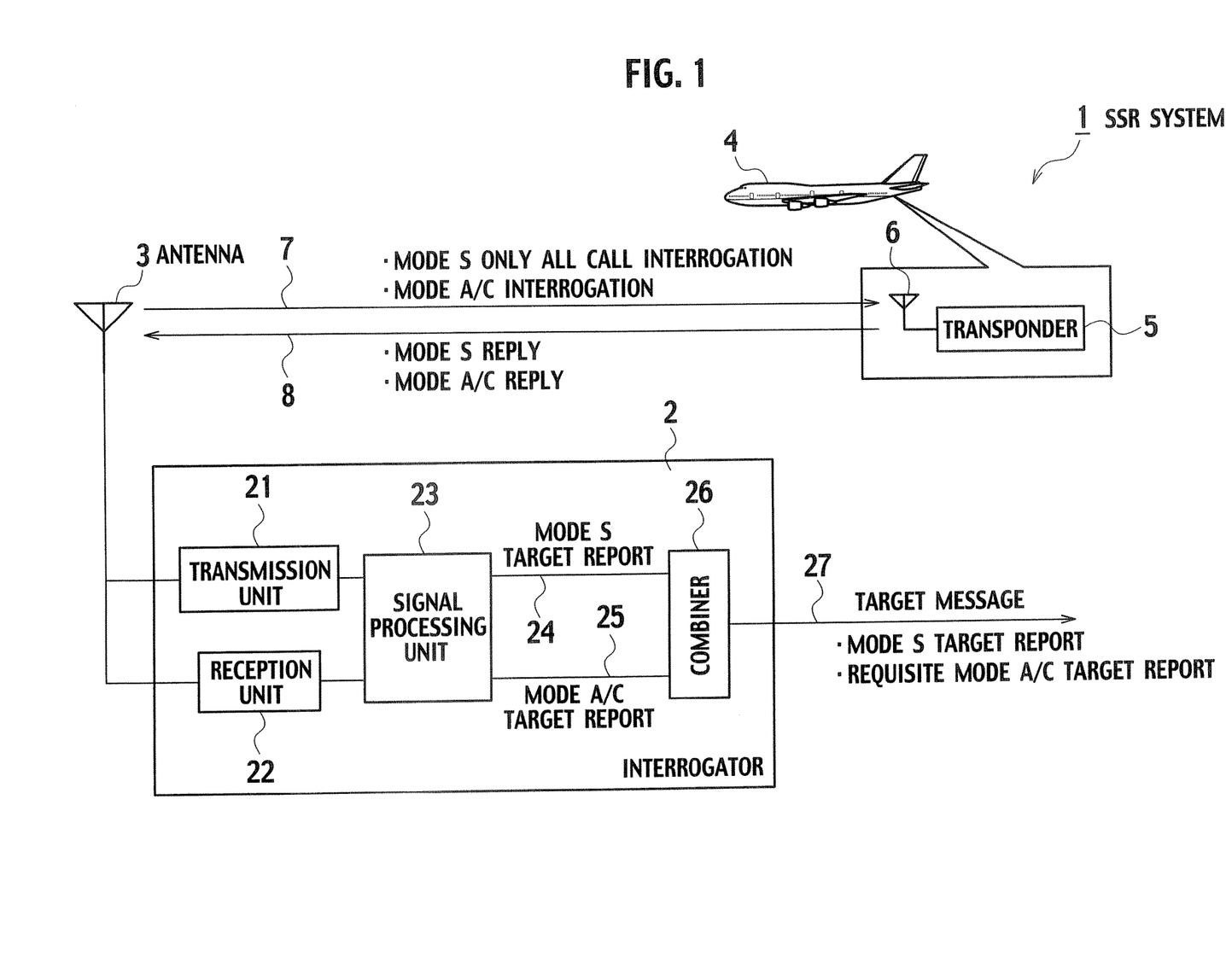
FIG. 1 is a block diagram of a secondary surveillance radar system according to one embodiment of the present invention.

FIG. 1 is a block diagram of an SSR (Secondary Surveillance Radar) system 1 according to one embodiment of the present invention. This SSR system 1 includes an interrogator 2, an antenna 3, a transponder 5 and an antenna 6. The interrogator 2 and the antenna 3 are placed on the ground, and the antenna 3 is horizontally turnable by 360 degrees. The transponder 5 and the antenna 6 are installed in an aircraft 4.

The interrogator 2 includes a transmission unit 21, a reception unit 22, a signal processing unit 23 and a combiner 26. The transmission unit 21 and the reception unit 22 are connected to the antenna 3. The signal processing unit 23 is connected to the transmission unit 21 and to the reception unit 22. Note that descriptions of an interface unit and the like used by a user for operating the system are omitted in this drawing.

The transmission unit 21 transmits interrogations 7 through the antenna 3. The interrogations 7 are broadly divided into all call interrogation and selective interrogation. The all call interrogations are broadly divided further into Mode S only all call interrogation, Mode A only all call interrogation, Mode A interrogation, Mode C only all call interrogation, and Mode C interrogation.

Figure 2:
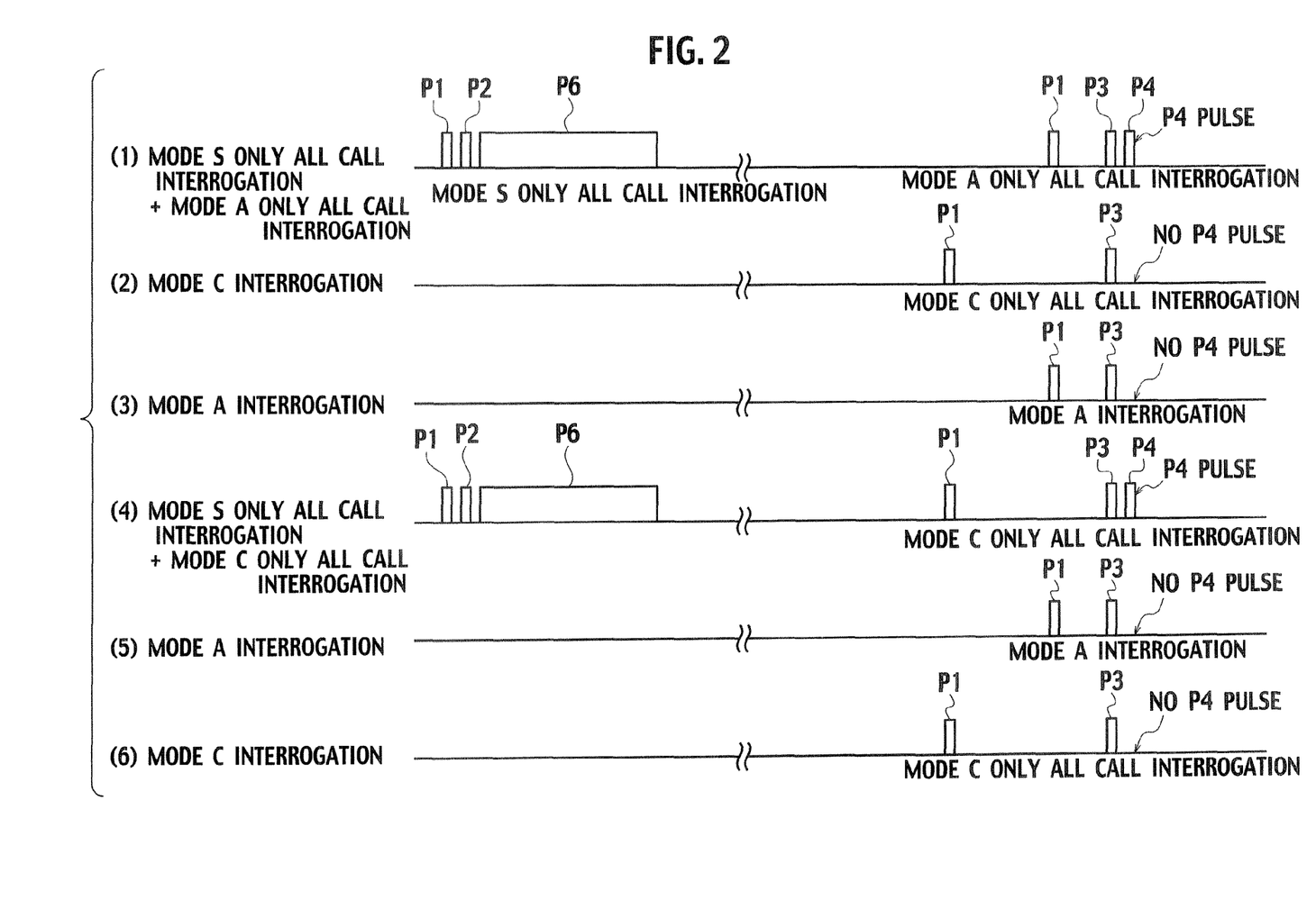
FIG. 2 is a diagram showing waveforms of interrogations.

Additionally, as shown in FIG. 2, the Mode A only all call interrogation and the Mode A interrogation are discriminated from each other by the presence or absence of P4 pulse, and so are the Mode C only all call interrogation and the Mode C interrogation.

During an all call interrogation transmission period during which all call interrogations are to be transmitted, the transmission unit 21 transmits the abovementioned five kinds of interrogations in combinations and in order as shown in FIG. 2. That is, those interrogations are transmitted in order from <1> to <6> which are:

<1> a first Mode S only all call interrogation and a Mode A only all call interrogation;

<2> a first Mode C interrogation;

<3> a first Mode A interrogation;

<4> a second Mode S only all call interrogation and a Mode C only all call interrogation;

<5> a second Mode A interrogation; and

<6> a second Mode C interrogation.

The transmitted interrogations (the interrogations 7 in FIG. 1) of the five kinds are received by the transponder 5. The transponder 5 sends back replies (replies 8 in FIG. 1) corresponding respectively to the received interrogations of the five kinds.

The replies 8 are received by the reception unit 22 through the antenna 3. The signal processing unit 23 interprets contents of each of the received replies. On the basis of this interpretation, the signal processing unit 23 generates a Mode S target report 24 and a Mode A/C target report 25. Note that these target reports are generated every time a scan (a transmission of interrogations and a reception of replies thereto) is performed by the antenna 3.

If an aircraft can be identified through Mode S, the combiner 26 rejects (eliminates) a Mode A/C target report regarding the aircraft, i.e., an unnecessary Mode A/C target report. The combiner 26 then outputs the Mode S target report, and requisite Mode A/C target reports, i.e., target reports regarding other aircrafts that cannot be identified though Mode S but can be identified through Mode A/C.

A configuration of the abovementioned combiner 26 will be described hereinafter.

Figure 3:
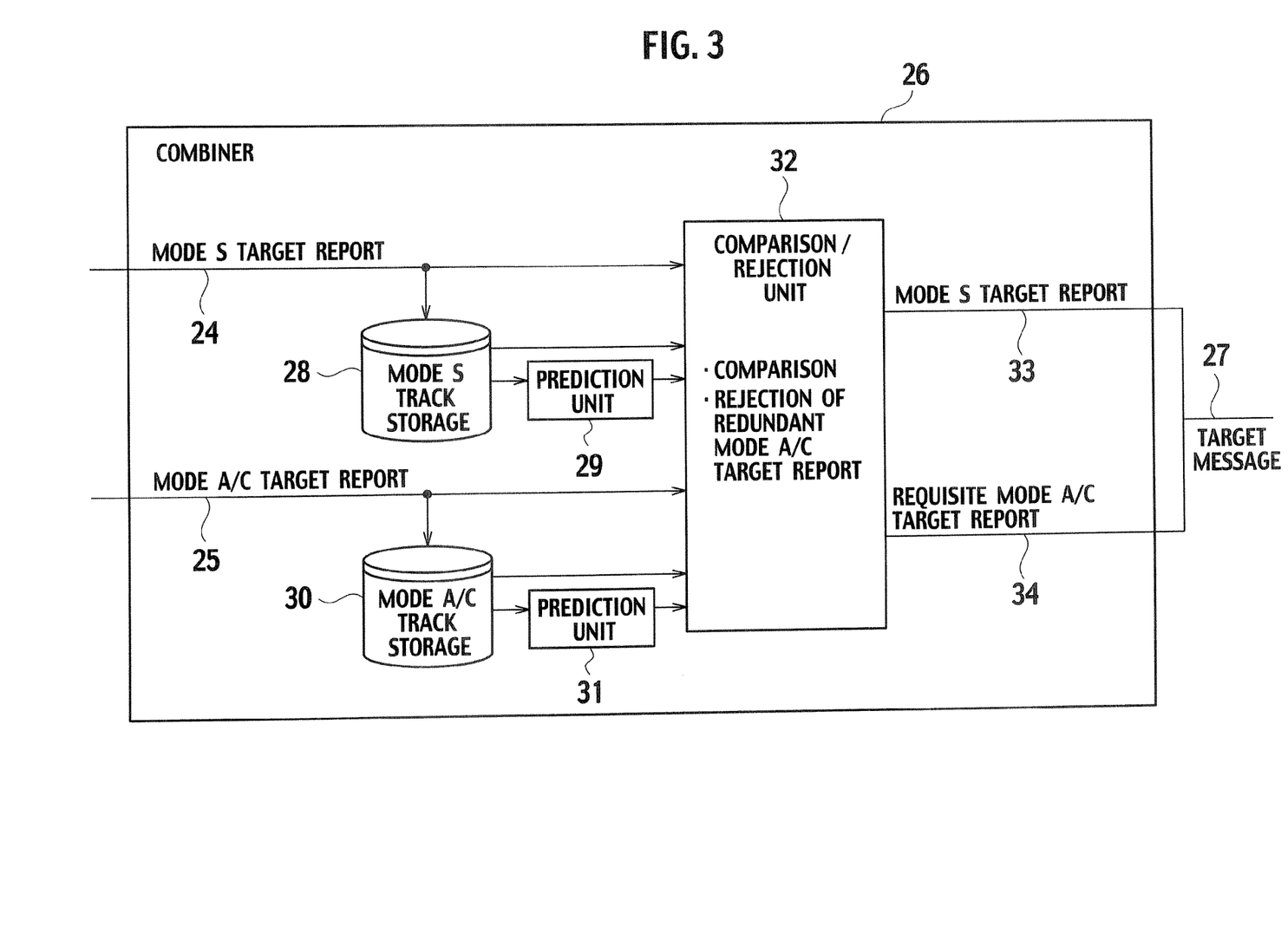
FIG. 3 is a diagram showing details of a combiner in FIG. 1.

The combiner 26 is composed of a Mode S track storage 28, prediction units 29 and 31, a Mode A/C track storage 30, and comparison/rejection processing unit 32 as shown in FIG. 3.

The Mode S track storage 28 generates a Mode S track (Mode S flight track information) on the basis of the Mode S target report outputted from the signal processing unit 23, and stores therein this Mode S track.

The prediction unit 29 predicts, on the basis of the Mode S track, a position of an aircraft at the time when a subsequent scan is performed by the antenna 3.

On the other hand, the Mode A/C track storage 30 generates a Mode A/C track (Mode A/C flight track information) on the basis of the Mode A/C target report outputted from the signal processing unit 23, and stores therein this Mode A/C track.

The prediction unit 31 predicts, on the basis of the Mode A/C track, a position of an aircraft at the time when the subsequent scan is performed by the antenna 3.

The Mode S track and the Mode A/C track can be judged as being tracks from the same aircraft with a high probability if these coincide with each other when they are compared with each other by the comparison/rejection processing unit 32. For this reason, the comparison/rejection processing unit 32 compares, to ranges of the foregoing predicted positions, positions indicated respectively in the Mode S target report 24 and the Mode A/C target report 25 which are generated when the subsequent scan is actually performed. Then, if this aircraft is located within the ranges of the predicted positions, the comparison/rejection processing unit 32 rejects the Mode A/C target report 25 (unnecessary Mode A/C target report), and outputs, in the form of a target message 27, a Mode S target report 33 and a requisite Mode A/C target report 34.

Note that, although a case where the Mode S track and the Mode A/C track are generated by the track storages (28 and 30) has been presented in the above description, these tracks may be configured to be previously generated by the signal processing unit 23 or the like.

Details of processing of the abovementioned rejection will be described hereinafter.

Figure 4:
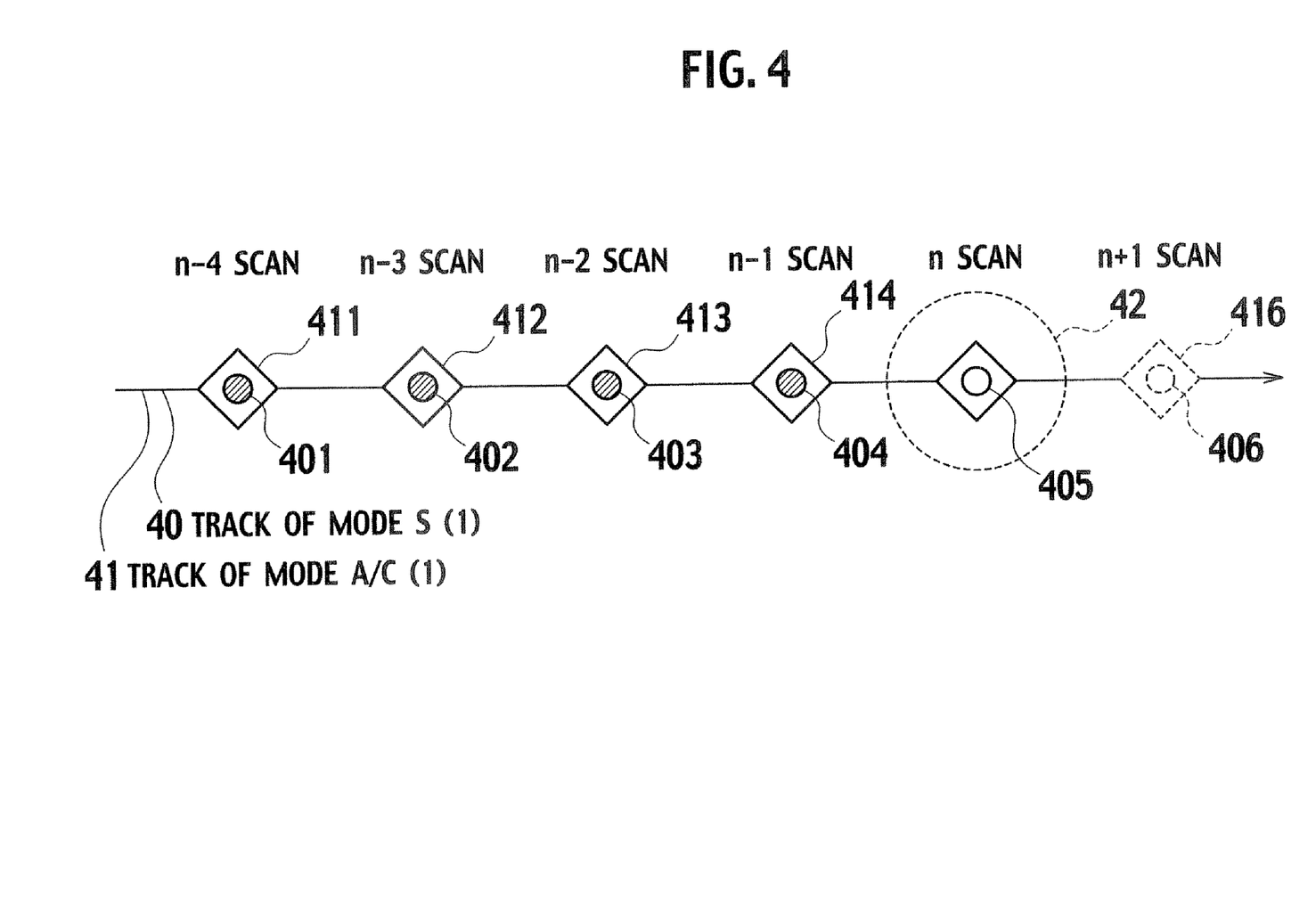
FIG. 4 is a diagram for explaining processing of the combiner.

FIG. 4 shows:
a track 40 of a Mode S (1) aircraft, which is obtained from n−4 to n−1 scans;
a track 41 of a Mode A/C (1) aircraft, which is obtained also from n−4 to n−1 scans; and
a predicted position range 42 obtained from the foregoing tracks.

Also, numerals in FIG. 4 respectively indicate as below.
401: plot of Mode A/C target report at n−4 scan (Va=1, Vc=1);
402: plot of Mode A/C target report at n−3 scan (Va=1, Vc=1);
403: plot of Mode A/C target report at n−2 scan (Va=1, Vc=1);
404: plot of Mode A/C target report at n−1 scan (Va=1, Vc=1);
405: plot of Mode A/C target report at n scan (Va=0, Vc=0);
406: plot of Made A/C target report at n+1 scan (Va=1, Vc=1);
411: plot of Mode S target report at n−4 scan;
412: plot of Mode S target report at n−3 scan;
413: plot of Mode S target report at n−2 scan;
414: plot of Mode S target report at n−1 scan;
415: plot of Mode S target report at n scan; and
416: plot of Mode S target report at n+1 scan.

Additionally, FIG. 4 shows the following case. In each of the n−4 to n−1 scans, there is a positional correlation between a Mode A/C target report and a Mode S target report. All of validities (Va and Vc) are 1. In addition, Mode A codes thereof coincide with each other, and there is also a correlation with respect to altitudes.

In this case, the Mode A/C target reports are judged as having been obtained from the aircraft indicated by the Mode S target reports, and are rejected.

Additionally, with respect to an n scan, this drawing shows a case where, although there is a positional correlation between the Mode A/C (1) target report and the Mode S (1) target report, validities are 0.

In this case, the predicted position range obtained from the track 41 of the n−1 and earlier scans is compared with a position of the aircraft identified by the n scan. If this aircraft is located within the predicted position range, the Mode A/C target report can be judged to have been generated from a Mode A/C reply of the aircraft indicating the Mode A/C (1) track 41. Therefore, the Mode A/C target report obtained from the n scan is rejected, and only the Mode S target report is outputted.

Note that, at this time, it is also effective to test in addition thereto whether the Mode S track and the Mode A/C track coincide with each other with respect to scans earlier than n−1 scan under a given condition, the condition such as whether the Mode S track and the Mode A/C track coincide with each other for consecutive two or three scans.

Another example of the rejection processing will be described hereinafter.

Figure 5:
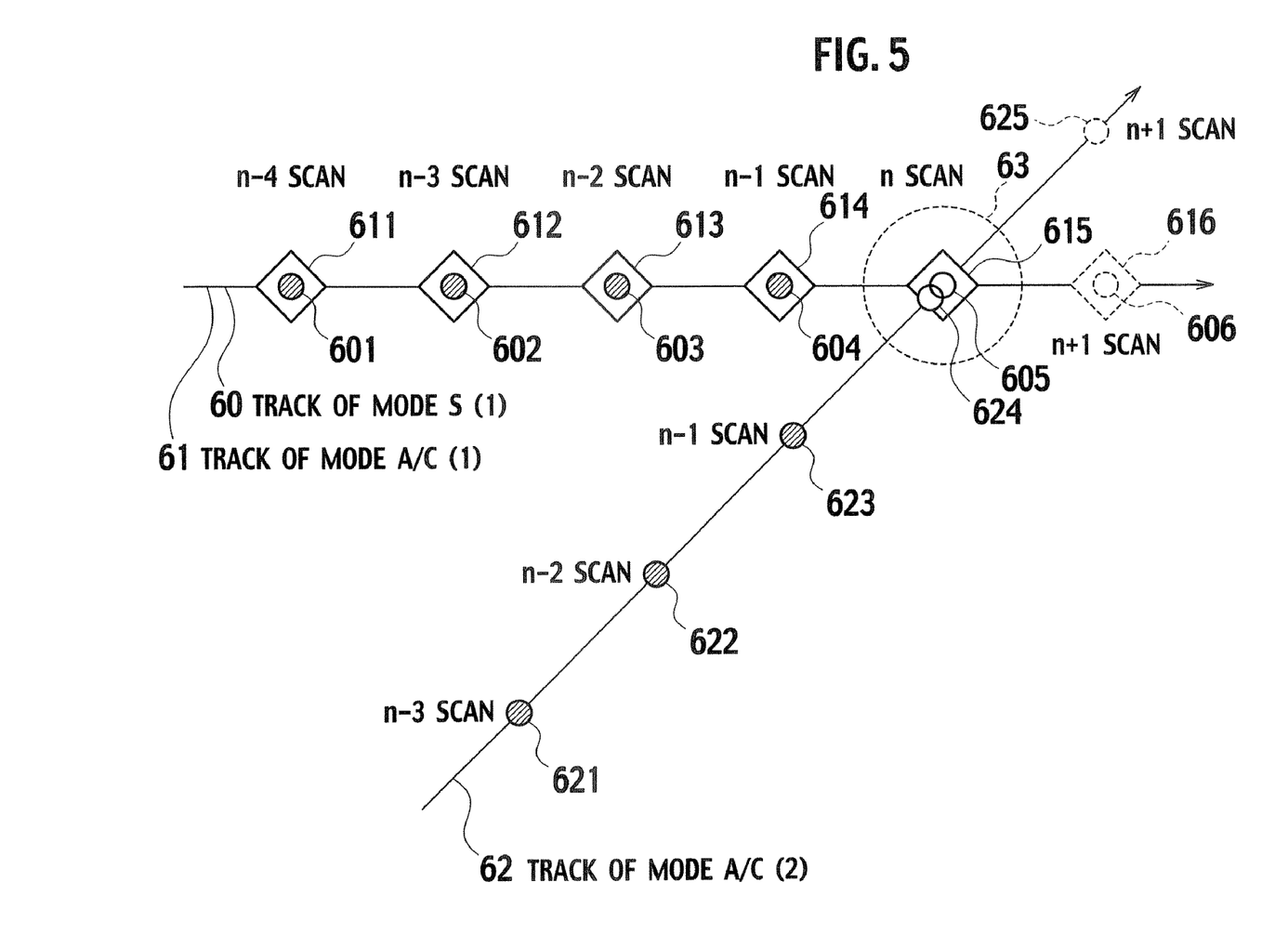
FIG. 5 is a diagram for explaining another example of the processing of the combiner.

FIG. 5 shows a case where a Mode A/C (2) aircraft different from the Mode S (1) aircraft passes the Mode S (1) aircraft at the time of an n scan.

Note that this drawing shows: a track 60 of a Mode S (1) aircraft, which is obtained from n−4 to n−1 scans; and a predicted position range 63 obtained from a track 61 of a Mode A/C (1) aircraft, which is obtained also from n−4 to n−1 scans. Additionally, this drawing shows a case where a predicted position range obtained from a track 62 of the Mode A/C (2) aircraft, which is obtained from n−3 to n−1 scans, overlaps the predicted position range 63.

Also, numeral in FIG. 5 respectively indicate as below:
601: plot of target report of Mode A/C (1) at n−4 scan (Va=1, Vc=1);
602: plot of target report of Mode A/C (1) at n−3 scan (Va=1, Vc=1);
603: plot of target report of Mode A/C (1) at n−2 scan (Va=1, Vc=1);
604: plot of target report of Mode A/C (1) at n−1 scan (Va=1, Vc=1);
605: plot of target report of Mode A/C (1) at n scan (Va=0, Vc=0);
606: plot of target report of Mode A/C (1) at n+1 scan (Va=1, Vc=1);
621: plot of Modes A/C (2) target report at n−3 scan (Va=1, Vc=1);
622: plot of Mode A/C (2) target report at n−2 scan (Va=1, Vc=1);
623: plot of Modes A/C (2) target report at n−1 scan (Va=1, Vc=1);
624: plot of Mode A/C (2) target report at n scan (Va=0, Vc=0);
625: plot of Mode A/C (2) target report at n+1 scan (Va=1, Vc=1);
611: plot of Mode S (1) target report at n−4 scan (Va=1, Vc=1);
612: plot of Mode S (1) target report at n−3 scan (Va=1, Vc=1);

613: plot of Mode S (1) target report at n−2 scan (Va=1, Vc=1);

614: plot of Mode S (1) target report at n−1 scan (Va=1, Vc=1);

615: plot of Mode S (1) target report at n scan (Va=1, Vc=1);

616: plot of Mode S (1) target report at n+1 scan (Va=1, Vc=1).

When there is a correlation between positions of the Mode A/C (1) aircraft and the Mode A/C (2) aircraft at the time of n scan in the above-described situation, a target report on the Mode A/C (2) aircraft is judged as being different from a target report on the Mode A/C (1) aircraft, and is outputted out of the combiner 26 without being rejected.

Note that, in some cases, a garble normally occurs in the predicted position range 63, and the Mode A/C (1) target report and the Mode A/C (2) target report are detected as two reports independent from each other. However, the Mode A/C (1) target report can be appropriately rejected even in these cases because validities are low in most cases.

Additionally, a method of analyzing replies for secondary surveillance radar, in which the secondary surveillance radar as described above is used, is also included in the scope of the present invention.

As has been described above, in the conventional technique, only information obtained from a current scan is subjected to comparison. Additionally, only if Va=1 and Vc=1, and if a position, a Mode A code and an altitude of one target report respectively coincide with those of another target report comparable thereto under a given condition, the Mode A/C target report is rejected. Accordingly, even in a case where there is a positional correlation between a Mode A/C target report and a Mode S target report, when it cannot be reliably judged whether or not the Mode A/C target report has been obtained from the same aircraft as the Mode S target report because of validity being zero, the Mode A/C target report comes to be outputted out of the combiner 26 even if it is unnecessary.

Meanwhile, the combiner 26 shown in the above-mentioned embodiment makes judgment by incorporating past track information in the judgment. The combiner therefore can reliably judge whether or not the Mode A/C target report has come from a different aircraft. Accordingly, this combiner can reliably reject an unnecessary Mode A/C target report, and thus capability of eliminating Mode A/C target reports can be enhanced.

What is claimed is:

1. A secondary surveillance radar which identifies an aircraft by transmitting interrogations to a transponder installed in an aircraft, by receiving replies corresponding respectively to the interrogations, and by then analyzing contents of the replies, the secondary surveillance radar comprising:

interrogation transmitting means, which transmits a first Mode S only all call interrogation and a Mode A only all call interrogation at the time of a first sweep operation, which transmits a first Mode C interrogation at the time of a second sweep operation, which transmits a first Mode A interrogation at the time of a third sweep operation, which transmits a second Mode S only all call interrogation and a Mode C only all call interrogation at the time of a fourth sweep operation, which transmits a second Mode A interrogation at the time of a fifth sweep operation, and which transmits a second Mode C interrogation at the time of a sixth sweep operation;

target report generating means, which receives replies corresponding respectively to the Mode S only all call interrogations, the Mode A only all call interrogation, the Mode A interrogations, the Mode C only all call interrogation, and the Mode C interrogations, and which generates a Mode S target report and a Mode A/C target report on the basis of these replies;

track information generating means, which generates, on the basis of the Mode S target report, Mode S track information indicating a flight track of the aircraft, and which generates, on the basis of the Mode A/C target report, Mode A/C track information indicating a flight track of the aircraft;

judgment means, which judges, on the basis of the Mode S track information and the Mode A/C track information, whether or not the Mode S target report and the Mode A/C target report are for the same target; and combiner means which eliminates the Mode A/C target report in a case where the Mode S target report and the Mode A/C target report are for the same target and outputs the Mode S target report only, and, in the other case, which outputs both the Mode S target report and the Mode A/C target report.

2. A method of analyzing replies for secondary surveillance radar, in which interrogations are transmitted to a transponder installed in an aircraft, replies corresponding respectively to the interrogations are received, and contents of each reply are then analyzed, the method comprising the steps of:

transmitting a first Mode S only all call interrogation and a Mode A only all call interrogation at the time of a first sweep operation;

transmitting a first Mode C interrogation at the time of a second sweep operation;

transmitting a first Mode A interrogation at the time of a third sweep operation;

transmitting a second Mode S only all call interrogation and a Mode C only all call interrogation at the time of a fourth sweep operation;

transmitting a second Mode A interrogation at the time of a fifth sweep operation;

transmitting a second Mode C interrogation at the time of a sixth sweep operation;

receiving replies corresponding respectively to the Mode S only all call interrogations, the Mode A only all call interrogation, the Mode A interrogations, the Mode C only all call interrogation and the Mode C interrogations, and generating a Mode S target report and a Mode A/C target report on the basis of these replies;

generating Mode S track information indicating a flight track of the aircraft on the basis of the Mode S target report, and Mode A/C track information indicating a flight track of the aircraft on the basis of the Mode A/C target report;

judging whether or not the Mode S target report and the Mode A/C target report are for the same target on the basis of the Mode S track information and the Mode A/C track information;

eliminating the Mode A/C target report in a case where the Mode S target report and the Mode A/C target report are for the same target; and outputting the Mode S target report only in the case where the Mode S target report and the Mode A/C target report are for the same target, and, in the other case, both the Mode S target report and the Mode A/C target report.

* * * * *